United States Patent
Kato et al.

(10) Patent No.: US 8,999,593 B2
(45) Date of Patent: Apr. 7, 2015

(54) EJECTOR APPARATUS FOR FUEL CELL

(75) Inventors: Takahide Kato, Tochigi (JP); Takao Ikenaga, Tochigi (JP); Kazunori Fukuma, Saitama (JP)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 554 days.

(21) Appl. No.: 13/356,969

(22) Filed: Jan. 24, 2012

(65) Prior Publication Data

US 2012/0189927 A1 Jul. 26, 2012

(30) Foreign Application Priority Data

Jan. 25, 2011 (JP) ................................. 2011-012810

(51) Int. Cl.
*H01M 8/04* (2006.01)

(52) U.S. Cl.
CPC ...... *H01M 8/04097* (2013.01); *H01M 8/04089* (2013.01); *H01M 8/04104* (2013.01); *H01M 8/04082* (2013.01); *H01M 8/04201* (2013.01); *Y02E 60/50* (2013.01)

(58) Field of Classification Search
USPC ................ 429/444, 446; 417/178, 413.1, 189
See application file for complete search history.

(56) References Cited

U.S. PATENT DOCUMENTS

| 8,017,275 B2 | 9/2011 | Fukuma |
| 8,329,354 B2 | 12/2012 | Fukuma et al. |
| 8,722,268 B2 | 5/2014 | Wake et al. |

FOREIGN PATENT DOCUMENTS

| JP | 2007-040193 A | 2/2007 |
| JP | 2009-144557 A | 7/2009 |
| JP | 2010-190097 A | 9/2010 |
| JP | 2010-272439 A | 12/2010 |

*Primary Examiner* — Patrick Ryan
*Assistant Examiner* — Julian Anthony
(74) *Attorney, Agent, or Firm* — Carrier Blackman & Associates, P.C.; Joseph P. Carrier; Anne G. Sabourin (57) ABSTRACT

An ejector apparatus for a fuel cell includes an ejector main body including an inlet port, an outlet port, a suction port, and an oxidizer-gas supply port, a first to third chambers provided in the body, a nozzle having a nozzle hole discharging the fuel gas, a diffuser mixing the fuel gas discharged from the nozzle hole and the fuel offgas exhausted from the fuel cell and returned to the suction port, a needle fixed on a side of the body and extending along an axial direction of the nozzle in a hollow portion thereof, and first and second diaphragms arranged to oppose each other, and changing an opening area in a gap between the nozzle hole and an outer peripheral face of the top end of the needle, wherein a pressure receiving area of the first diaphragm is set to be larger than that of the second diaphragm.

4 Claims, 4 Drawing Sheets

EJECTOR APPARATUS FOR FUEL CELL

BACKGROUND OF THE INVENTION

1. Field of the Invention

The present invention relates to an ejector apparatus for a fuel cell which the apparatus is incorporated in a fuel cell system and mixes a fuel offgas, which is exhausted from the fuel cell, with a fuel gas newly supplied and recirculates the fuel offgas.

2. Description of the Related Art

For example, in a fuel cell system, in order to enhance a power-generation efficiency of a fuel cell, it is used an ejector that mixes a fuel offgas (hydrogen offgas), which is exhausted from the fuel cell, with a fuel gas (hydrogen gas) newly supplied and recirculates the fuel offgas.

Regarding this kind of ejector, for example, according to Japanese Patent Laid-Open Publication No. 2009-144557, it is disclosed an ejector that comprises a first fluid chamber where a hydrogen gas is supplied, a bar-like needle, a nozzle for discharging the hydrogen gas supplied to the first fluid chamber from a discharge port (nozzle hole), a second fluid chamber where a hydrogen offgas is introduced, a diffuser provided on a discharge-port side of the nozzle, and a third fluid chamber where air is supplied. The ejector is configured so that: the first fluid chamber is provided between the second fluid chamber and the third fluid chamber; the first fluid chamber and the second fluid chamber are partitioned by a first diaphragm; the first fluid chamber and the third fluid chamber are partitioned by a second diaphragm having a same pressure receiving area as the first diaphragm; and the needle and the nozzle are separated from each other by pressure of the air introduced into the third fluid chamber and are made to approach with each other by pressure of the hydrogen offgas introduced into the second fluid chamber.

According to the ejector disclosed in the Japanese Patent Laid-Open Publication No. 2009-144557, due to the air supplied to the third fluid chamber and the hydrogen offgas introduced into the second fluid chamber, since directions in relatively moving the needle and the nozzle are made opposite and cancel each other, it is assumed that even if supply pressure of the hydrogen gas supplied to the first fluid chamber fluctuates, a flow rate of a hydrogen gas (mixed gas) discharged from the discharge port of the nozzle can be constant.

Incidentally, according to the ejector disclosed in the Japanese Patent Laid-Open Publication No. 2009-144557, there is a problem that when the supply pressure of the hydrogen gas supplied to the first fluid chamber is applied, the nozzle results in being displaced toward an opening side. It is inferred that this is due to, for example, an area of a seat portion, which is a base face, of the nozzle; hydrogen-gas discharge pressure from the nozzle hole; and the like.

SUMMARY OF THE INVENTION

The present invention is achieved in view of the above mentioned point and provides an ejector apparatus for a fuel cell that can prevent a nozzle on a movable side from being displaced toward an opening side with respect to a needle on a fixed side when supply pressure of a fuel gas is applied to an ejector main body.

The ejector apparatus of the invention comprises: an ejector main body including an inlet port to which a fuel gas is supplied, an outlet port configured to communicate with the fuel cell, a suction port configured to be connected to a circulation passage and from which a fuel offgas exhausted from the fuel cell and returned to the suction port is sucked, and an oxidizer-gas supply port to which an oxidizer gas is supplied; a first chamber configured to be provided in the ejector main body and communicate with the inlet port, the fuel gas being supplied into the first chamber; a second chamber configured to be provided in the ejector main body and communicate with the suction port, the fuel offgas being supplied into the second chamber; a third chamber configured to be provided in the ejector main body and communicate with the oxidizer-gas supply port, the oxidizer gas being supplied into the third chamber; a nozzle including a nozzle hole, the nozzle hole discharging the fuel gas supplied to the nozzle through the inlet port; a diffuser configured to mix the fuel gas discharged from the nozzle hole, and the fuel offgas exhausted from the fuel cell and returned to the suction port through the circulation passage; a needle configured to be fixed on a side of the ejector main body and extend along an axial direction in a hollow portion of the nozzle; and a first diaphragm and a second diaphragm configured to be arranged to oppose each other with positioning the first chamber between the first and second diaphragms, displace the nozzle along an axial direction of the needle, and change an opening area in a gap between the nozzle hole of the nozzle and an outer peripheral face of a top end of the needle, wherein a pressure receiving area of the first diaphragm is arranged on a side of the oxidizer-gas supply port is set to be larger than that of the second diaphragm arranged on a side of the suction port.

For example, it is assumed that when the pressure of the fuel offgas introduced into the second chamber is higher than that of the oxidizer gas supplied into the third chamber, it is assumed that the nozzle is positioned at a predetermined position. At this time, when the supply pressure of the fuel gas supplied into the first chamber is applied thereto, a force for displacing (moving) the nozzle toward an opening side of the nozzle is generated, and by the force, the nozzle attempts to be displaced from the predetermined position to the opening side.

According to the ejector apparatus of the invention, because a pressure receiving area S1 of the first diaphragm arranged with opposing each other and making the first chamber intervene between the first diaphragm and the second diaphragm is set to be higher than a pressure receiving area S2 of the second diaphragm (S1>S2), a force for displacing the nozzle toward a closing side thereof. The force for displacing the nozzle toward the closing side thereof and essentially consisting of a force corresponding to a pressure-receiving-area difference (S1−S2) between the pressure receiving area S1 of the first diaphragm and the pressure receiving area S2 of the second diaphragm.

Thus according to the ejector apparatus of the invention, the force for displacing the nozzle toward the opening side thereof and the force, which corresponds to the pressure-receiving-area difference (S1−S2) of the first and second diaphragms, for displacing the nozzle toward the closing side thereof are canceled with each other; thereby the nozzle is held at the predetermined position as it is.

As a result thereof, according to the ejector apparatus of the invention, even when the supply pressure of the fuel gas supplied into the first chamber is applied thereto, it is possible to suitably prevent the nozzle on a movable side from being displaced toward the opening side with respect to the needle on a fixed side.

Furthermore, according to the ejector apparatus of the invention, because the displacement of the nozzle toward the opening side is prevented and the predetermined position of the nozzle is held, it is possible to prevent discharge pressure of the fuel gas discharged from the nozzle from being excessive. Furthermore, because the nozzle is held at the predetermined position, it is possible to perform a nozzle control from the predetermined position; therefore, it is possible to widen a control width (increase a controllable range) of the discharge pressure of the fuel gas discharged from the nozzle and enhance a control stability of the nozzle.

Furthermore, the ejector apparatus of the invention further comprises a bearing member and a seat portion, wherein the bearing member is provided in the nozzle and is configured to support the needle along the axial direction thereof and be integrally displaced together with the nozzle, and wherein the bearing member comprises the seat portion configured to sit at a valve seat provided in the ejector main body.

According to the ejector apparatus of the invention, the seat portion is provided at the bearing member arranged in the nozzle, and thereby it is possible to obtain the seat portion reduced in diameter compared to a case of the seat portion being provided on an end face of the nozzle. Furthermore, by reducing the diameter of the seat portion, it is possible to increase face pressure of the seat face and enhance a seat close contact of the seat portion in comparison with that of a conventional seat portion.

PREFERRED EMBODIMENT(S) FOR CARRYING OUT THE INVENTION

Next will be described an ejector apparatus for a fuel cell (hereinafter simply referred to as "ejector apparatus" or "ejector" as needed) of embodiments of the present invention in detail with reference to drawings as needed after describing a fuel cell system where the ejector apparatus is incorporated.

Figure 1:
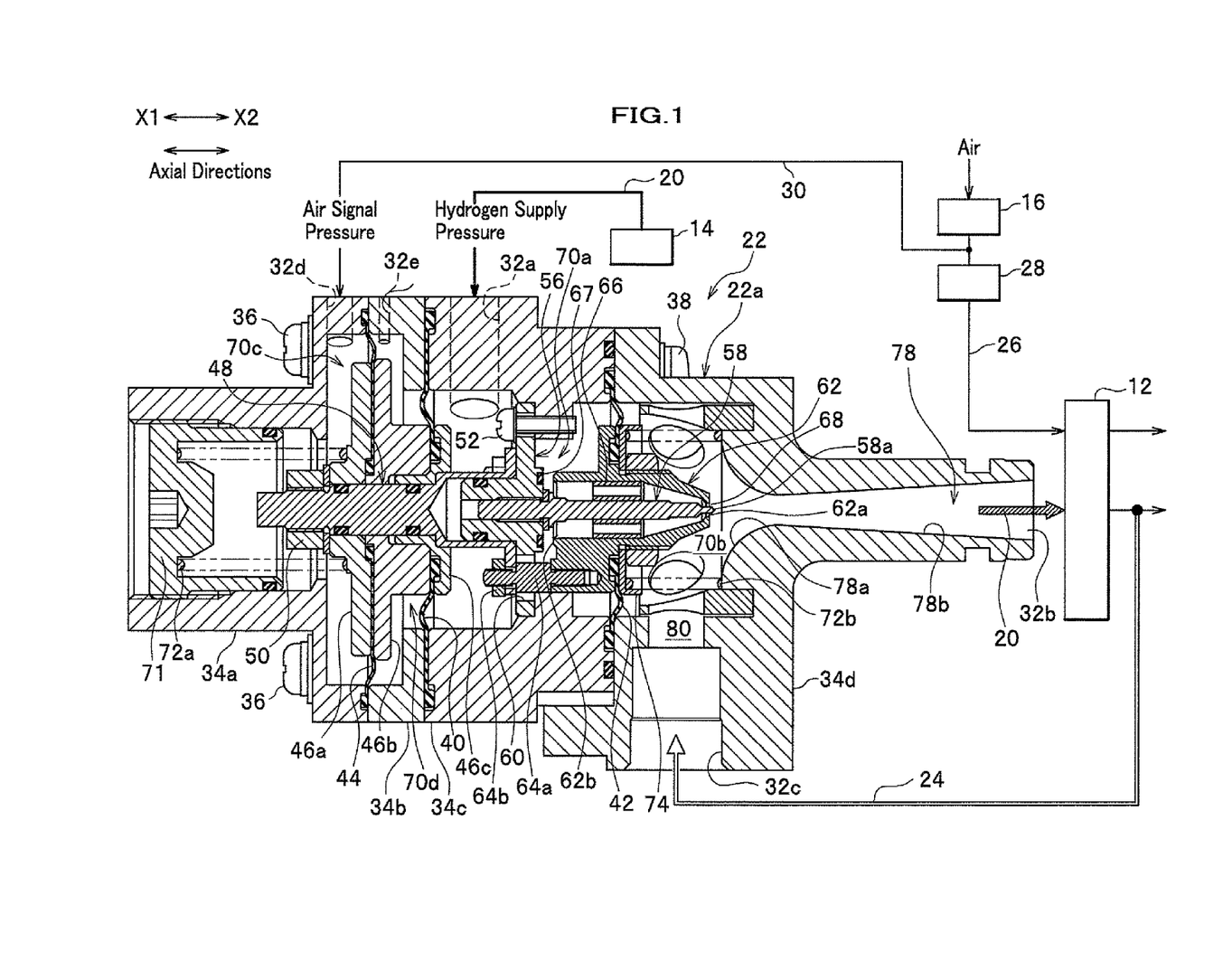
FIG. 1 is a vertical section view along axial directions of an ejector apparatus for a fuel cell, which the ejector apparatus is incorporated in a fuel cell system, relating to an embodiment of the present invention.

As shown in FIG. 1, the fuel cell system comprises: a fuel cell 12; a hydrogen tank 14, in which a high-pressure hydrogen gas is filled, configured to supply the hydrogen gas to the fuel cell 12 as a fuel gas; an air compressor 16 configured to supply compressed air containing an oxidizer gas (oxygen gas) to the fuel cell 12; and a gas-liquid separation and dilution unit (not shown) for separating a non-reacted hydrogen gas exhausted from the fuel cell 12 into a gas (hydrogen gas) and a liquid (water), and diluting the separated hydrogen gas by non-reacted air exhausted from the fuel cell 12.

The fuel cell 12 comprises, for example, a polymer electrolyte fuel cell (PEFC) and is mounted on a vehicle such as a fuel-cell automobile. The fuel cell 12 comprises a stack main body (not shown) configured by stacking a plurality of unit cells (not shown), an anode where a hydrogen gas is supplied as a fuel gas, and a cathode where, for example, air containing an oxygen gas is supplied as an oxidizer gas.

A hydrogen supply passage 20 is provided between the hydrogen tank 14 and the fuel cell 12, and an ejector 22 is provided in the passage 20. The ejector 22 is configured to be connected to (see FIG. 1) a circulation passage 24 configured to feed back a non-reacted hydrogen gas (hereinafter referred to as "hydrogen offgas") of a fuel offgas exhausted from the fuel cell 12; and to mix a hydrogen gas newly supplied from the hydrogen tank 14 and the hydrogen offgas fed back from the fuel cell 12 and resupply (recirculate) the mixed gas to the fuel cell 12.

In addition, between the hydrogen tank 14 and the ejector 22 is provided a hydrogen-pressure adjustment unit (not shown) including a regulator and the like that introduce air as a pilot signal from the air compressor 16 and adjust pressure of a hydrogen gas supplied to the fuel cell 12 to predetermined pressure.

Between the air compressor 16 and the fuel cell 12 is provided an air supply passage 26, and therein is arranged a humidifier 28 configured to humidify dry air supplied from the compressor 16. The air humidified by the humidifier 28 is introduced into a cathode side of the fuel cell 12 through the air supply passage 26.

Furthermore, between the air compressor 16 and the humidifier 28 is provided a branch passage 30 (see FIG. 1). A downstream side of the branch passage 30 is connected to the ejector 22; air (compressed air) supplied through the passage 30 is introduced into the ejector 22 as sir signal pressure. In addition, it is preferable in the branch passage 30 to provide an orifice (not shown) for throttling the compressed air supplied from the air compressor 16 down to a predetermined flow rate.

In the gas-liquid separation and dilution unit are provided, for example: a hydrogen purge valve (not shown) for purging a fuel gas containing water pooled in the anode, and a nitrogen gas mixed in the anode and permeating an electrolyte membrane from the cathode; a catch tank (not shown) for separating a hydrogen gas, which is exhausted from the fuel cell 12 and contains a moisture, into a hydrogen gas and water; a drain valve (not shown) for opening and closing a duct for draining a drainage pooled in the catch tank; and the like.

Next will be described the ejector 22 with reference to FIGS. 1 and 2.

As shown in FIG. 1, the ejector 22 comprises an ejector main body 22a; the body 22a is configured so that a plurality of block bodies are integrally coupled as described later.

The ejector main body 22a comprises an inlet port 32a where a comparative high-pressure hydrogen gas (fuel gas) is supplied from the hydrogen tank 14 connected to the hydrogen supply passage 20 through a filter not shown, and an outlet port 32b from which a mixture gas, where the hydrogen offgas and the hydrogen gas supplied from the tank 14 connected to the passage 20 communicating with the fuel cell 12 are mixed, is exhausted.

Furthermore, the ejector main body 22a comprises a suction port 32c connected to the circulation passage 24 and by which the hydrogen offgas (fuel offgas) is sucked through the passage 24, an air supply port 32d (oxidizer-gas supply port) connected to the branch passage 30 and where compressed air (oxidizer gas) derived from the air compressor 16 through the branch passage 30 is supplied, and a breathing port 32e configured to communicate with an atmosphere.

The ejector main body 22a comprises a first block body 34a where the air supply port 32d is provided, a second block body 34b where the breathing port 32e is provided, a third block body 34c where the inlet port 32a is provided, and a fourth block body 34d where the outlet port 32b and the suction port 32c are provided. The first to third block bodies 34a, 34b, and 34c are integrally fastened by a plurality of fixation bolts 36 separated at a predetermined angle along a peripheral direction of the bodies 34a, 34b, and 34c; furthermore, the second to fourth block bodies 34b, 34c, and 34d are integrally fastened by a plurality of fixation bolts 38 separated at a predetermined angle along a peripheral direction of the bodies 34b, 34c, and 34d.

Between the first block body 34a and the second block body 34b is arranged a third diaphragm 44 having a comparative large diameter, and an outer peripheral edge portion of the diaphragm 44 is sandwiched by the block bodies 34a and 34b. Furthermore, between the second block body 34b and the third block body 34c is arranged a first diaphragm 40 having a comparative medium diameter opposing the third diaphragm 44, and an outer peripheral edge portion of the diaphragm 40 is sandwiched by the block bodies 34b and 34c. Moreover, between the third block body 34c and the fourth block body 34d is arranged a second diaphragm 42 having a comparative small diameter opposing the first diaphragm 40, and an outer peripheral edge portion of the diaphragm 42 is sandwiched between the block bodies 34c and 34d.

In the ejector main body 22a is formed a third chamber 70c partitioned by an inner wall of the first block body 34a and the third diaphragm 44, and the chamber 70c is configured to communicate with the air supply port 32d; the air signal pressure is supplied into the chamber 70c. Furthermore, in the ejector main body 22a is formed an atmospheric-pressure chamber 70d partitioned by the third diaphragm 44 and the first diaphragm 40; the chamber 70d is configured to communicate with the atmosphere through the breathing port 32e. Moreover, in the ejector main body 22a is formed a first chamber 70a partitioned by the first diaphragm 40 and the second diaphragm 42, and the chamber 70a is configured to communicate with the inlet port 32a; a hydrogen gas is supplied into the chamber 70a. Still furthermore, in the ejector main body 22a is formed an second chamber 70b partitioned by an inner wall of the thud block body 34c and the second diaphragm 42, and the chamber 70b is configured to communicate with the suction port 32c; the hydrogen offgas is introduced into the chamber 70b.

Figure 2:
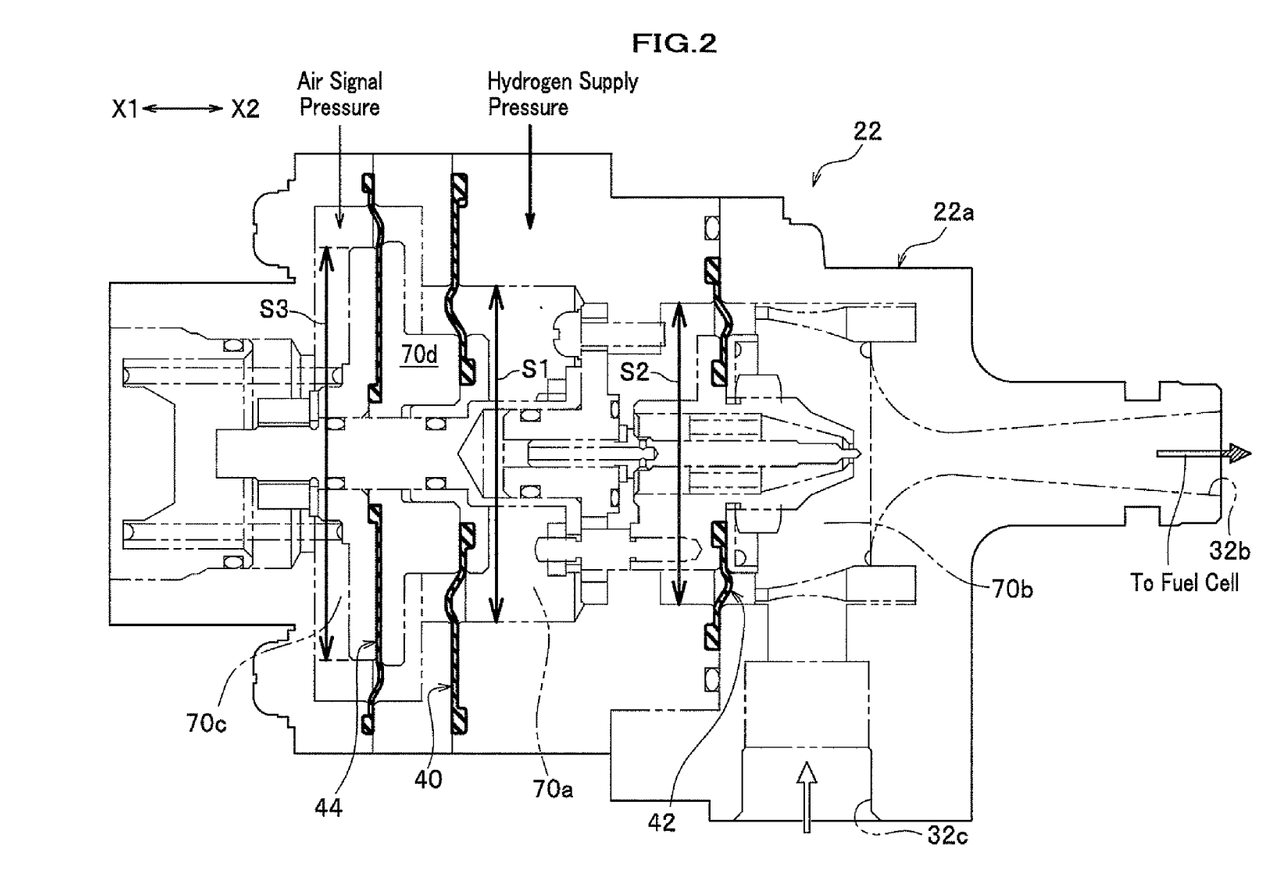
FIG. 2 is an illustration drawing where a plurality of diaphragms arranged in an ejector-apparatus main body of the ejector apparatus are shown by bold solid lines.

In this case, as shown in FIG. 2, a pressure receiving area S1 of the first diaphragm 40 and a pressure receiving area S2 of the second diaphragm 42 are not same, wherein the diaphragms 40 and 42 are arranged with opposing each other and the supply pressure of the hydrogen gas is given to each of the diaphragms 40 and 42; the area S1 is set to be larger than the area S2 (S1>S2).

That is, without making the pressure receiving areas S1 and S2 of the first and second diaphragms 40 and 42 equal which the diaphragms 40 and 42 are arranged with opposing each other and positioning the first chamber 70a, into which the hydrogen gas is supplied, between the diaphragms 40 and 42; and by setting the area S1 of the diaphragm 40 adjacently arranged on the air supply port (oxidizer gas supply port) 32d side (air signal side) to be larger than the area S2 of the diaphragm 42 adjacently arranged on the suction port 32c side (hydrogen-offgas side); thus, a force for displacing the nozzle 62 toward a closing side (arrow-mark direction X1) is generated, corresponding to a pressure-receiving-area difference (S1−S2) between the diaphragms 40 and 42. As described later, the force for displacing the nozzle 62 toward the closing side, and a force generated when the supply pressure of the hydrogen gas is applied and for displacing the nozzle 62 toward an opening side (arrow-mark direction X2) cancel each other.

In addition, according to an embodiment of the invention described above, the three diaphragms consisting of the first to third diaphragms 40, 42, and 44 are arranged with making the atmospheric chamber 70d intervene between the first chamber 70a, into which the hydrogen gas is supplied, and the third chamber 70c into which the compressed air is supplied, it is possible to basically generate the force, which displaces the nozzle 62 toward the closing side (arrow-mark direction X1) due to the pressure-receiving-area difference (S1−S2), by two diaphragms consisting of the diaphragms 40 and 42, and possible to omit the diaphragm 44.

Furthermore, according to the embodiment a pressure receiving area S3 of the third diaphragm 44 is set to be larger than the pressure receiving area S1 of the first diaphragm 40 (S3−S1). As a result thereof, with respect to a magnitude relation among the pressure receiving areas of the respective diaphragms, the pressure receiving area S3 of the third diaphragm 44 is set to be largest, the pressure receiving area S1 of the first diaphragm 40 is set to be second in magnitude, and the pressure receiving area S2 of the second diaphragm 42 is set to be third in magnitude (S3>S1>S2). In addition, for convenience, FIG. 2 is drawn with making the pressure receiving areas S1, S2, and S3 of the respective diaphragms correspond to diameters of pressure receiving faces of the diaphragms S1, S2, and S3, respectively.

Returning to FIG. 1, inside the ejector main body 22a are provided: a first holding member 46a and a second holding member 46b configured to sandwich the third diaphragm 44 through an obverse surface and reverse surface thereof, respectively; the second holding member 46b and a third holding member 46c configured to sandwich the first diaphragm 40 through an obverse surface and reverse surface thereof, respectively; a holder 48 configured to penetrate center portions of the holding member 46a, 46b, and 46c and integrally hold them; a nut member 50 configured to be fastened to a thread portion of the holder 48 through a washer; and a stator 56 fixed to the third block body 34c of the ejector main body 22a by a plurality of bolts 52 and where an abutting face (stopper face) with which one end of the holder 48 abuts is formed.

Moreover, inside the ejector main body 22a are provided: a needle 58 whose base portion is fixed to a hole portion of the stator 56 and which is extended along an axial direction of the nozzle 62 (described later) in a hollow portion thereof, a coupling bolt 64a and a coupling nut 64b inserted through a through hole 60 of the stator 56 and configured to fasten the holder 48 and the nozzle 62; the nozzle 62 coupled with the holder 48 through the bolt 64a and the nut 64b and having a nozzle hole 62a fronted by a top end 58a of the needle 58; and a bearing member 66 fixed to an inner wall of the nozzle 62 and configured to be integrally displaced together with the nozzle 62, and having a sliding hole configured to slide along the needle 58, and a communication hole through which a fluid flows. In this case, the first to third holding members 46a, 46b, and 46c are integrally fastened between an expanded-diameter step portion of the holder 48 and the nut member 50.

In addition, the nozzle 62 comprises the nozzle hole 62a formed at one end thereof along the axial direction thereof and a seat portion 62b formed at a peripheral edge of the other end on an opposite side of the nozzle 62; the portion 62b is provided so as to be able to sit at a valve seat 67 formed in the ejector main body 22a.

In the third chamber 70c is provided a first spring member 72a whose one end is engaged in an end cap 71 and the other end is engaged in the first holding member 46a; the spring member 72a is provided so as to press (energize) the first to third holding members 46a, 46b and 46c, and the holder 48 toward a nozzle 62 side. Furthermore, in the second chamber 70b is provided a second spring member 72b whose one end is engaged in a retainer 74 and the other end is engaged in a receiving seat face of an inner wall of the fourth block body 34d; the spring member 72b is provided so as to press (energize) the nozzle 62 toward a holder 48 side by a spring force thereof.

In this case the spring force of the first spring member 72a is set to be larger than that of the second spring member 72b; when a pressurized fluid is not supplied into the third chamber 70c and the second chamber 70b, an annular flange portion of the holder 48 abuts with the stator 56 due to a difference of the spring forces of the spring members 72a and 72b, and an opening area in a gap 68 between the nozzle hole 62a of the nozzle 62 and an outer peripheral face of the top end 58a of the needle 58 is in an initial state of being held at a maximum position.

Moreover, inside the fourth block body 34d of the ejector main body 22a is provided a diffuser 78 configured to be arranged on a one-end side along the axial direction of the nozzle 62 and be provided coaxially with the nozzle 62. The needle 58 is fronted to the nozzle hole 62a and comprises the top end 58a including an acute apex.

The diffuser 78 is configured with: an expanded diameter portion 78a like a trumpet surrounding a part of the nozzle 62 having the nozzle hole 62a; and a throat portion 78b essentially consisting of a cylindrical body continuing into the diameter portion 78a and having inside itself a linear passage gradually expanded in diameter toward the outlet port 32b.

In this case, the nozzle 62, the needle 58, and the diffuser 78 are arranged so as to be coaxial with each other (axes of the three match). A suction chamber 80 is formed between the nozzle 62 and the diffuser 78 and is provided so as to communicate with the suction port 32c.

From a relationship between air signal pressure introduced into the third chamber 70c and pressure of the hydrogen gas introduced into the second chamber 70b, the first to third diaphragms 40, 42, and 44 are bent; thereby, the holder 48 and the nozzle 62 are integrally displaced in the arrow-mark direction X1 (closing side), and it is possible to change the opening area in the gap 68 between the nozzle hole 62a, from which the hydrogen gas is ejected toward the diffuser 78, and the top end 58a.

The ejector 22 of the embodiment incorporated in the fuel cell system is basically configured as mentioned above, and next, its action and effect will be described.

Figure 3A:
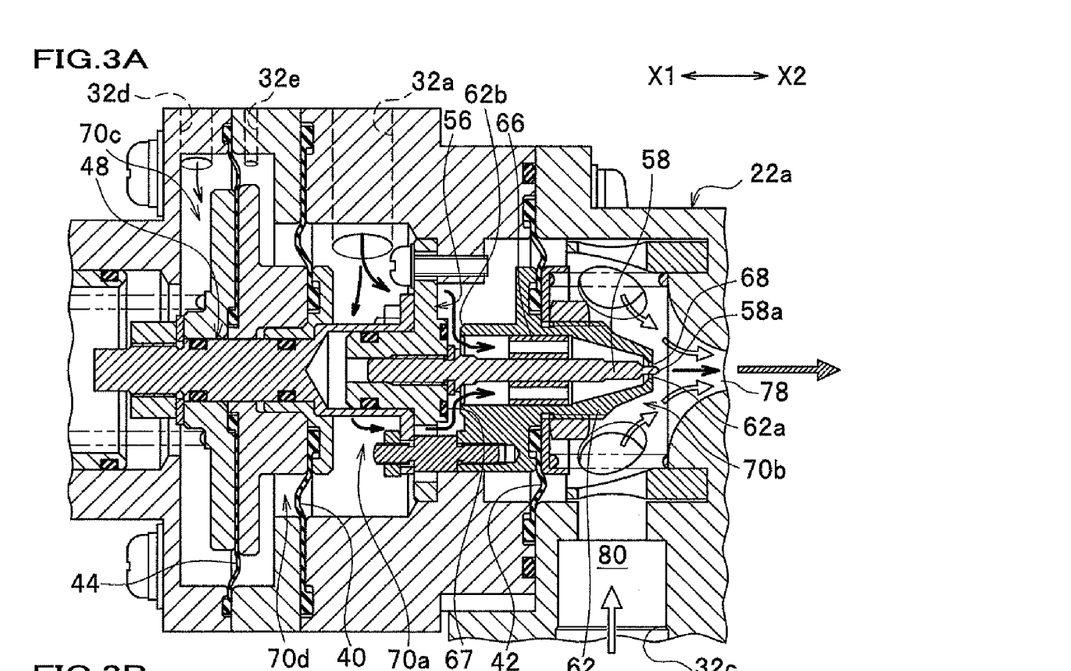
FIG. 3A is a partial section view showing a positional relationship between a nozzle hole and a needle hole in an initial state of the ejector apparatus.

Firstly, as shown in FIG. 3A, when a power generation of the fuel cell 12 is stopped, a hydrogen supply from the hydrogen tank 14 is shut off by a shut-off valve not shown, and a hydrogen supply to the inlet port 32a of the ejector 22 is in a stopped state. Simultaneously, a drive of the air compressor 16 is in a stopped state, and a compressed-air supply to the supply port 32d of the ejector 22 is in a stopped state.

In this case, because the spring force of the first spring member 72a is set to be larger that of the second spring member 72b, the annular flange portion of the holder 48 abuts with the stator 56 due to the difference of the spring forces between the spring members 72a and 72b, and the opening area in the gap 68 between the nozzle hole 62a of the nozzle 62 and the outer peripheral face of the top end 58a of the needle 58 is in the initial state of being held at the maximum position (see FIG. 3A).

In the initial state, as shown in FIG. 3A, the top end 58a of the needle 58 is slightly protruded outside from the nozzle hole 62a. Accordingly, the opening area (gap 68) of the nozzle hole 62a from which the hydrogen gas is discharged is obtained by subtracting an outer diameter of the top end 58a of the needle 58 from an inner area of the hole 62a.

On the other hand, when the power generation of the fuel cell 12 is in operation, the shut-off valve not shown is in an opened state, a hydrogen gas is supplied to the anode of the fuel cell 12 from the hydrogen tank 14 through the hydrogen supply passage 20, the air compressor 16 is driven, and air humidified by the humidifier 28 is supplied to the cathode of the fuel cell 12 through the air supply passage 26.

With respect to the ejector 22, a comparative high-pressure hydrogen gas is supplied to the ejector main body 22a from the hydrogen tank 14 through the inlet port 32a and, in the main body 22a, is supplied into the first chamber 70a partitioned by the first diaphragm 40 and the second diaphragm 42. Simultaneously, compressed air from the air compressor 16 is supplied into the third chamber 70c through the branch passage 30 and the air supply port 32d.

At this time, when pressure of the hydrogen offgas introduced into the second chamber 70b is equal to or smaller than pressure (air signal pressure) of the compressed air in the third chamber 70c, the annular flange portion of the holder 48 abuts with the stator 56 similarly to the initial state, and the initial state of the opening area in the gap 68 between the nozzle hole 62a of the nozzle 62 and the outer peripheral face of the top end 58a of the needle 58 being held at the maximum position is continued.

After the hydrogen gas introduced into the first chamber 70a of the ejector 22 is further introduced into the hollow portion of the nozzle 62 through the communication hole of the bearing member 66 fitted inside the nozzle 62, the hydrogen gas is discharged toward a diffuser 78 side through the gap 68 between the nozzle hole 62a and the top end 58a of the needle 58. The hydrogen gas throttled down in flow rate and accelerated by the nozzle hole 62a flows along the throat portion 78b of the diffuser 78 and is supplied to the fuel cell 12 along the hydrogen supply passage 20 from the outlet port 32b.

Simultaneously, when the hydrogen gas is ejected (discharged) toward the diffuser 78 from a top end of the nozzle hole 62a of the nozzle 62, a negative pressure action occurs at a region between the nozzle 62 and the expanded diameter portion 78a of the diffuser 78 by a so-called jet-pump effect. The hydrogen offgas in the suction chamber 80 is sucked by the negative pressure action, the hydrogen gas discharged from the nozzle 62 and the hydrogen offgas sucked through the suction port 32c are mixed in the diffuser 78, and the mixed hydrogen gas is introduced into the fuel cell 12 from the outlet port 32b through the hydrogen supply passage 20.

In an operation state of the fuel cell 12, when the pressure of the hydrogen offgas introduced into the second chamber 70b through the suction port 32c is higher than the pressure (air signal pressure) of the compressed air introduced into the third chamber 70c through the branch passage 30 and the air supply port 32d, a pressing force by the hydrogen offgas overcomes the spring force of the first spring member 72a and bends the first to third diaphragms 40, 42, and 44; the holder 48 and the nozzle 62 are integrally displaced in the arrow-mark direction X1 (closing side) under a guidance action of the cylindrical portion of the holder 48.

Accordingly, a part inclusive of the top end 58a of the needle 58 is in a state of being protruded outside from the top end of the nozzle hole 62a of the nozzle 62 and being exposed. As a result thereof, because the hydrogen gas introduced into the hollow portion of the nozzle 62 is discharged toward the diffuser 78 through the gap 68, which is reduced to be minute, of the nozzle hole 62a, it is possible to supply a comparatively small flow rate of the hydrogen gas to the fuel cell 12. Thus depending on the displacement of the holder 48 and the nozzle 62, it is possible to change the supply of the hydrogen gas from a comparatively large flow rate to a comparatively small flow rate.

Figure 3B:
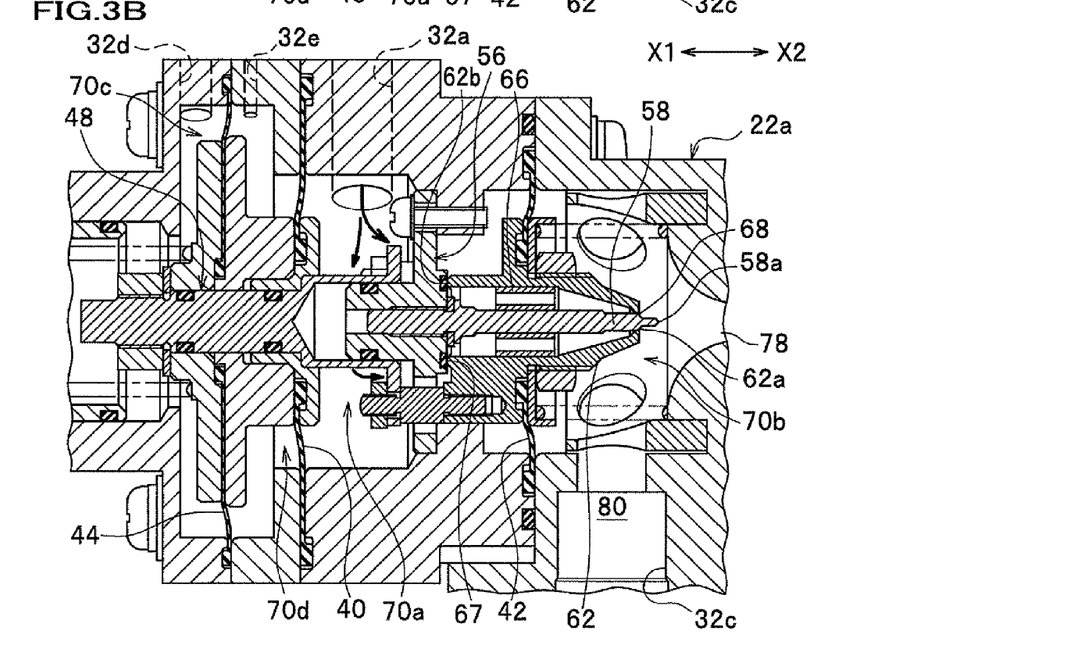
FIG. 3B is a partial section view showing a state of: the nozzle and a holder thereof being integrally displaced; and an opening area of the nozzle hole being changed from the state in FIG. 3A.

Here, when the holder 48 and the nozzle 62 is further displaced toward the closing side (arrow-mark direction X1), the seat portion 62b formed in the nozzle 62 sits at the valve seat 67 formed in the ejector main body 22a, and the nozzle 62 is positioned at a nozzle-seat position (shut-off position) (see FIG. 3B). In this case, it is possible to make a flow rate of the hydrogen gas discharged from the nozzle hole 62a of the nozzle 62 zero.

Incidentally, assume that the nozzle 62 is positioned at a predetermined position, for example, the nozzle-seat position (see FIG. 3B) when the pressure of the hydrogen offgas introduced into the second chamber 70b is higher than the air signal pressure of the third chamber 70c. At this time, when the supply pressure of the hydrogen gas supplied into the first chamber 70a is applied thereto, a force for displacing (moving) the nozzle 62 in the opening-side direction (arrow-mark direction X2), the nozzle 62 attempts by the force to be displaced from the nozzle-seat position toward the opening side. It is inferred that the force generated by applying the supply pressure of the hydrogen gas is as described above due to, for example, the area of the seat portion 62b of the base face of the nozzle 62, gas discharge pressure from the nozzle hole 62a, and the like.

On the contrary, according to the embodiment, because the pressure receiving area S1 of the first diaphragm 40 on the air-signal-pressure side is set to be larger than the pressure receiving area S2 of the second diaphragm 42 on the hydrogen-offgas side (S1>S2) which the diaphragms 40 and 42 are arranged with opposing each other, the force for displacing the nozzle 62 in the closing-side direction (arrow-mark direction X1) acts. The force for displacing the nozzle 62 toward the closing side essentially consists of a force corresponding to the pressure-receiving-area difference (S1–S2) between the pressure receiving area S1 of the first diaphragm 40 and the pressure receiving area S2 of the second diaphragm 42.

Thus according to the embodiment, with each other are canceled: the force generated by the supply pressure of the hydrogen gas supplied into the first chamber 70a being applied thereto, and for displacing the nozzle 62 in the opening-side direction (arrow-mark direction X2); and the force corresponding to the pressure-receiving-area difference (S1–S2) between the pressure receiving area S1 of the first diaphragm 40 and the pressure receiving area S2 of the second diaphragm 42, and for displacing the nozzle 62 in the closing-side direction (arrow-mark direction X1), and thus the nozzle 62 is held at the nozzle-seat position (see FIG. 3B) as it is. Thereby, it is possible to prevent the nozzle 62 on the movable side from being displaced toward the opening side (arrow-mark direction X2) with respect to the needle 58 on the fixed side.

As a result thereof, according to the embodiment, even when the supply pressure of the hydrogen gas supplied into the first chamber 70a is applied thereto, it is possible to suitably prevent the nozzle 62 on the movable side from being displaced toward the opening side with respect to the needle 58 on the fixed side.

Furthermore, according to the embodiment, because the nozzle 62 on the movable side is prevented from being displaced toward the opening side and the nozzle 62 is held at the nozzle-seat position, it is possible to prevent the discharge pressure of the hydrogen gas, which is discharged from the nozzle hole 62a of the nozzle 62, from being excessive.

Moreover, according to the embodiment, because the nozzle 62 is held at the nozzle-seat position, it becomes possible to perform a nozzle control from the position; therefore, it is possible to widen a control width (increase a controllable range) of the discharge pressure of the hydrogen gas discharged from the nozzle hole 62a and enhance a control stability thereof.

In addition, according to the embodiment, although one example of a predetermined position in the nozzle 62 is described as the nozzle-seat position, the predetermined position is not limited thereto; in a range of the nozzle 62 being movable is available an optional position such as a position adjacent to the nozzle-seat position, a small-opened position, a medium-opened position, or the like. In this case, when the pressure of the hydrogen offgas introduced into the second chamber 70b is higher than the air signal pressure supplied into the third chamber 70c, the optional position changes the air signal pressure to be reduced (air-pressure reducing control). Furthermore, according to the embodiment, although the invention is applied to the ejector 22 whose nozzle 62 comprises the seat portion 62b, the invention may also be applied to an ejector whose nozzle does not comprise a seat portion (ejector comprising a nozzle where a seat portion is not provided).

Still furthermore, according to the embodiment, the pressure receiving area S3 of the third diaphragm 44 is set to be larger than the pressure receiving area S1 of the first diaphragm 40 and the pressure receiving area S2 of the second diaphragm 42 (S3>S1>S2). Accordingly, increasing the air signal pressure supplied into the third chamber 70c and bending the third diaphragm 44, and thereby making the bending movement of the diaphragm 44 act on the first diaphragm 40 and the second diaphragm 42, thus it is possible to displace the nozzle 62 toward the opening side from a position on the closing side and increase the opening area (gap 68) of the nozzle hole 62a from which the hydrogen gas is discharged.

Figure 4:
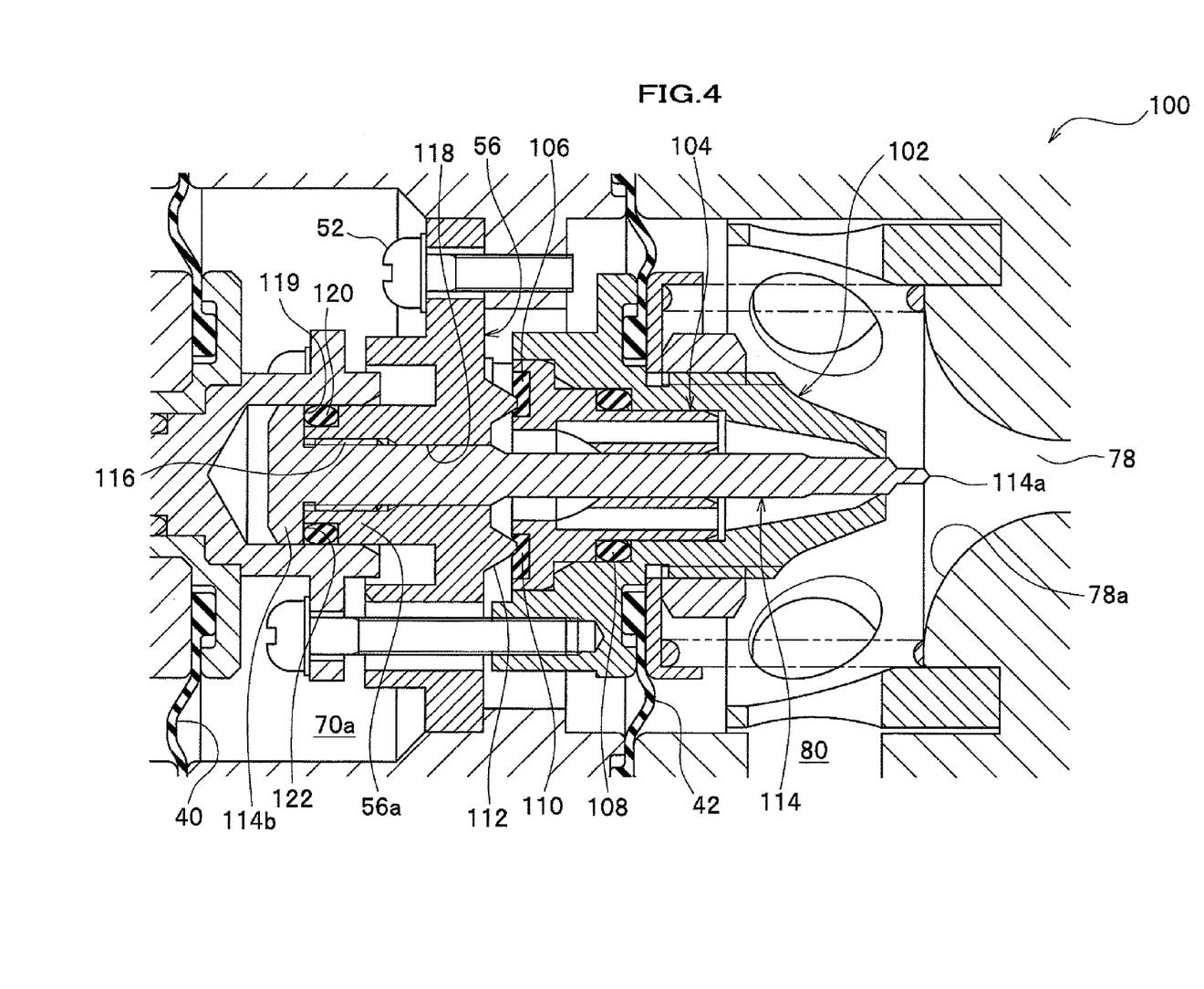
FIG. 4 is a main-portion enlarged vertical section view of an ejector apparatus for a fuel cell relating to another embodiment of the invention.

Next, an ejector of another embodiment of the invention is shown in FIG. 4. In addition, to a same element as in the ejector 22 shown in FIG. 1 will be appended a same symbol, and a detailed description thereof will be omitted.

As shown in FIG. 4, an ejector 100 of the embodiment is characterized in that a rubber seat portion 106 is provided on one side along an axial direction of a bearing member 104 arranged in a nozzle 102 and that the member 104 is integrally displaced together with the nozzle 102.

That is, an annular groove 110 is formed on one end face along the axial direction of the bearing member 104 arranged in the nozzle 102, and the rubber seat portion 106 is attached (adhered) to the groove 110; thereby, compared to the case of FIG. 1 where the seat portion 62 is provided on the end face of the nozzle 62, it is possible to obtain the seat portion 106 reduced in diameter. Furthermore, by reducing the diameter of the seat portion 106, it is possible to enhance a seat close-contact of the portion 106 whose face pressure is increased in comparison with that of a conventional seat portion. In addition, between an inner diameter face of the nozzle 102 and an outer diameter face of the bearing member 104 is provided an O-ring 108 configured to seal a coupled region between the nozzle 102 and the member 104; thus the member 104 is integrally displaced together with the nozzle 102.

In this case, by forming the seat portion 106 with, for example, an elastic material such as a rubber which the portion 106 is attached inside the annular groove 110 of the bearing member 104 which is on a movable side (valve-body side), and by forming a valve seat with a metal material and essentially consisting of an annular protrusion portion 112 of a chevron shape in section configured to be protruded toward a bearing member 104 side which the valve seat is positioned on a stator 56 side (ejector main body) at which the portion 106 of the member 104 is configured to sit, it is possible to achieve a weight saving of the member 104, and accordingly, total weight of the ejector 100.

Furthermore, a thread portion 116 configured to be fitted outside a male thread formed on an outer diameter face of a needle 114 and a cylindrical inlaid portion 118, in which the face of the needle 114 is inserted, are provided in contact with each other on an inner peripheral face of a cylindrical portion 56a of the stator 56, which is a fixed side, along an axial direction of the needle 114 with respect to the stator 56. By arranging the thread portion 116 and the inlaid portion 118 in contact with each other along an axial direction of the needle 114, it is possible to built the needle 114 in the stator 56 of the fixed side in a state of an axial center of the needle 114 being high-precisely aligned with respect to the stator 56.

Moreover, at an end on a side opposite to a top end 114a of the needle 114 is provided a flange portion 114b expanded in diameter in comparison with other regions. An inner side wall 119 of the flange portion 114b is configured to form a part of an annular groove 122 to which an O-ring 120 is attached.

What is claimed is:

1. An ejector apparatus for a fuel cell comprising:
an ejector main body including an inlet port to which a fuel gas is supplied, an outlet port which communicates with the fuel cell, a suction port connected to a circulation-passage and from which a fuel offgas exhausted from the fuel cell and returned to the suction port is sucked, and an oxidizer-gas supply port to which an oxidizer gas is supplied; a first chamber provided in the ejector main body which communicates with the inlet port, the fuel gas being supplied into the first chamber; a second chamber which is provided in the ejector main body and communicates with the suction port, the fuel offgas being supplied into the second chamber; a third chamber which is provided in the ejector main body and communicates with the oxidizer-gas supply port, the oxidizer gas being supplied into the third chamber; a nozzle including a nozzle hole, the nozzle hole discharging the fuel gas supplied to the nozzle through the inlet port; a diffuser which mixes the fuel gas discharged from the nozzle hole, and the fuel offgas exhausted from the fuel cell and returned to the suction port through the circulation passage;
a needle which is fixed on a side of the ejector main body and extends along an axial direction of the nozzle in a hollow portion of the nozzle; and a first diaphragm and a second diaphragm, each having a pressure receiving area, S1 and S2 respectively, and positioned opposing each other, wherein the first chamber is located between the first and second diaphragms, and wherein the first diaphragm is arranged on a side of the oxider gas supply port and has a larger pressure receiving area than the second diaphragm, arranged on a side of the suction port, and a force supplied by the gas from the first chamber to the first and second diaphragms displaces the nozzle along an axial direction of the needle, and changes an opening area in a gap between the nozzle hole of the nozzle and an outer peripheral face of a top end of the needle.

2. The ejector apparatus according to claim 1 further comprising a bearing member and a seat portion, wherein the bearing member is provided in the nozzle and is supports the needle along the axial direction of the needle and is integrally displaced together with the nozzle, and wherein the bearing member comprises the seat portion which sits at a valve seat provided in the ejector main body.

3. An ejector apparatus for a fuel cell comprising:
an ejector main body including an inlet port connected to a hydrogen supply, to which a fuel gas is supplied, an outlet port which communicates with the fuel cell, a suction port connected to a circulation passage and from which a fuel offgas exhausted from the fuel cell and returned to the suction port is sucked, and an oxidizer-gas supply port connected to a branch passage where oxidizer gas provided from an air compressor is supplied;
a first chamber is provided in the ejector main body and communicates with the inlet port, the fuel gas being supplied into the first chamber;
a second chamber is provided in the ejector main body and communicates with the suction port, the fuel offgas being supplied into the second chamber;
a third chamber is provided in the ejector main body and communicates with the oxidizer-gas supply port, the oxidizer gas being supplied into the third chamber;
a nozzle comprising bearing member and a seat portion, wherein the bearing member supports the needle along the axial direction of the needle and is integrally displaced together with the nozzle, and wherein the bearing member comprises the seat portion configured to sit at a valve seat provided in the ejector main body, the nozzle including a nozzle hole, the nozzle hole discharging the fuel gas supplied to the nozzle through the inlet port;
a diffuser for mixing the fuel gas discharged from the nozzle hole, and the fuel offgas exhausted from the fuel cell and returned to the suction port through the circulation passage;
a needle is fixed on a side of the ejector main body and extends along an axial direction of the nozzle in a hollow portion of the nozzle; and
a first diaphragm and a second diaphragm are positioned opposing each other wherein the first chamber is located between the first and second diaphragms, wherein the nozzle extends along an axial direction of the needle, and the first and second diaphragms change an opening area in a gap between the nozzle hole of the nozzle and an outer peripheral face of a top end of the needle,
a pressure receiving area of the first diaphragm arranged on a side of the oxidizer-gas supply port is set to be larger than a pressure receiving area of the second diaphragm arranged on a side of the suction port.

4. A fuel ejector apparatus according to claim 1 wherein the force supplied by gas from the first chamber corresponds to a force that is the pressure receiving area difference (S1−S2) between the pressure receiving area of the first diaphragm (S1) and the pressure receiving area of the second diaphragm (S2).

* * * * *